Feb. 21, 1967    E. C. SCHWARTZ    3,305,859
FUNCTION GENERATOR FOR RADAR STC CIRCUITS
Filed July 2, 1965    2 Sheets-Sheet 1

(a) SYNC. PULSE (b) MONOSTABLE MULTI-VIBRATOR (c) BLANKING PULSE (d) STC FUNCTION GEN. OUTPUT

INVENTOR
EDWARD C. SCHWARTZ

BY Harry A. Herbert Jr
    ATTORNEY

James S. Shannon
    AGENT

INVENTOR
EDWARD C. SCHWARTZ

BY Harry A. Herbert Jr.
ATTORNEY

James S. Shannon
AGENT

United States Patent Office 3,305,859
Patented Feb. 21, 1967

3,305,859
FUNCTION GENERATOR FOR RADAR STC CIRCUITS
Edward C. Schwartz, Cheektowaga, N.Y., assignor to the United States of America as represented by the Secretary of the Air Force
Filed July 2, 1965, Ser. No. 472,754
3 Claims. (Cl. 343—5)

This invention relates to STC (sensitivity-time-control) circuits and, more particularly, a function generator for use in such circuits.

The STC circuit is used to automatically increase the gain of a radar receiver so that signal amplitude is independent of range. The reflected signal of a radar pulse is proportional to the reciprocal of the fourth power of the range for point targets or the third power of range for area or beam-limited targets. Therefore, if the receiver gain is adjusted high enough to observe distant targets, serious overloading and accompanying loss of discrimination will result for near-by targets. Typical STC circuits, such as described in "Microwave Receiver," vol. 23 of Radiation Laboratory Series, pages 374–378, utilize an exponential voltage decay to control the receiver gain for this purpose.

The general object of the invention is to achieve a more precise control of receiver gain in an STC system. More specifically, the object is to provide a function generator for producing a voltage that varies with time in such a manner that, when applied as a gain control voltage to the control grids of the early IF stages in the radar receiver, the resulting receiver gain variation with time compensates for the decline in received signal strength with range more effectively than in previous STC circuits.

An additional object of the invention is to make provision in the function generator for the application of blanking pulses to the IF grids for the purpose of rendering the radar receiver insensitive during the transmission of the radar pulses.

The function generator in accordance with the invention comprises a capacitor, across which the gain control voltage is developed, and means for applying an initial fixed negative charge to the capacitor prior to the transmission of each radar pulse. During an interval following the transmitted pulse corresponding in length to the maximum range of the system the capacitor is allowed to discharge through two parallel paths, one having a short time constant and the other a long time constant. The short time constant path contains a zener diode which is in breakdown at the start of the interval but passes out of the breakdown state after about 30 microseconds, thereby opening the short time constant discharge path. The capacitor continues to discharge through the long time constant path for the remainder of the interval. Therefore, the gain control voltage produced by the function generator becomes less negative rapidly during the early part of the interval and considerably less rapidly during the remainder of the interval, which causes the receiver gain to increase rapidly from a low value during the early part of the interval and less rapidly during the remainder of the interval. The use of two discharge circuits of different time constants invariably enables the achievement of a more desirable function generator characteristic than could be achieved by a single time constant circuit, and by proper choice of circuit parameters, the receiver gain versus time character may be made a closer approximation of the desired power function of gain. Two time constants are sufficient to approximate a third or fourth power function. Other STC functions may require more than two time constants in which case additional time constant circuits utilizing the zener diode may be provided.

A cathode follower stage is used to couple the gain control voltage produced across the capacitor to the grids of the IF stages. Blanking pulses are applied simultaneously to the grid and cathode of this stage, a diode being used between the control grid and the capacitor to isolate the capacitor from the blanking pulses.

For a fuller understanding of the nature and objects of the invention, reference should be had to the following detailed description taken in connection with the accompanying drawings, in which:

FIG. 5 is a modification of the function generator of FIG. 4 to provide more than two time constants.

Figure 1:
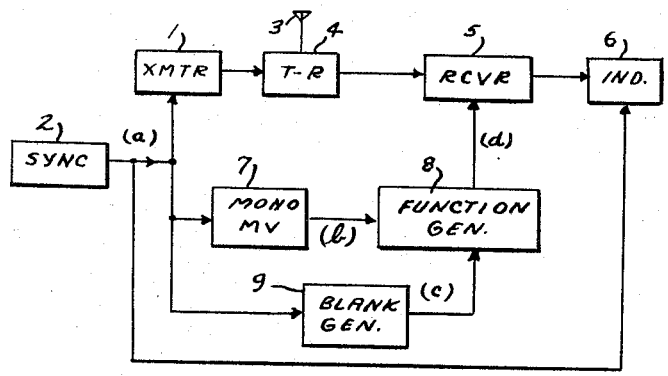
FIG. 1 is a simplified block diagram of a radar system in which this invention is suitably embodied.
Figure 2:
FIG. 2 is a diagram of the waveforms produced by the various units of the radar system.
Figure 2:
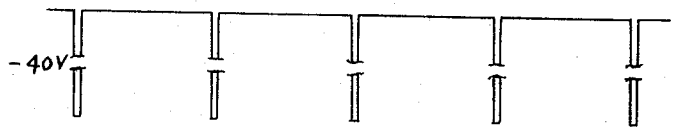
Figure 2:
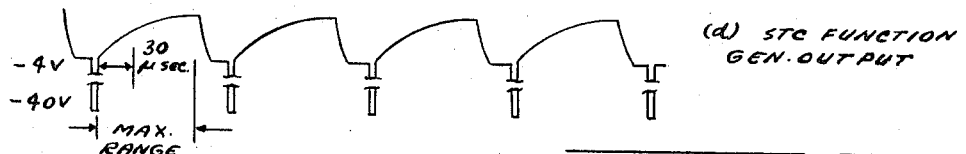

Referring to FIG. 1 which is a block diagram of a typical radar system in which the STC function generator could be used, the transmitter 1 is triggered by synchronizing pulses of constant repetition rate, derived from pulse generator 2 and illustrated at (a) in FIG. 2, to produce pulses of high frequency energy which are applied to antenna 3 through transmit-receive network 4. Echoes of these pulses received by antenna 3 are applied through T–R network 4 to receiver 5, the resulting video output pulses of which are applied to indicator 6. The synchronizing pulses from generator 2 also trigger a monostable multivibrator 7 which produces the negative-going rectangular pulses shown at (b) in FIG. 2. The rectangular pulse, which is in effect a range gate, defines the range expanse over which the radar is operative, the leading edge occurring at an interval after the radiated pulse corresponding to the minimum range of the system and the trailing edge at an interval after the radiated pulse corresponding to the maximum range. These rectangular pulses control the operation of the function generator 8 which acts during the intervals defined by the pulses to produce the already mentioned gain control voltage for receiver 5. Blanking pulses, which render the receiver insensitive during the transmitted radar pulses, are also applied through function generator 8 to the receiver, these pulses, shown at (c) in FIG. 2, being produced by blanking pulse generator 9 in synchronism with the radiated pulses. The composite gain control voltage applied to the receiver by the function generator network is shown at (d) in FIG. 2, that portion responsible for controlling the receiver gain in such manner that the receiver output is substantially independent of range being shown more precisely in FIG. 3.

Figure 4:
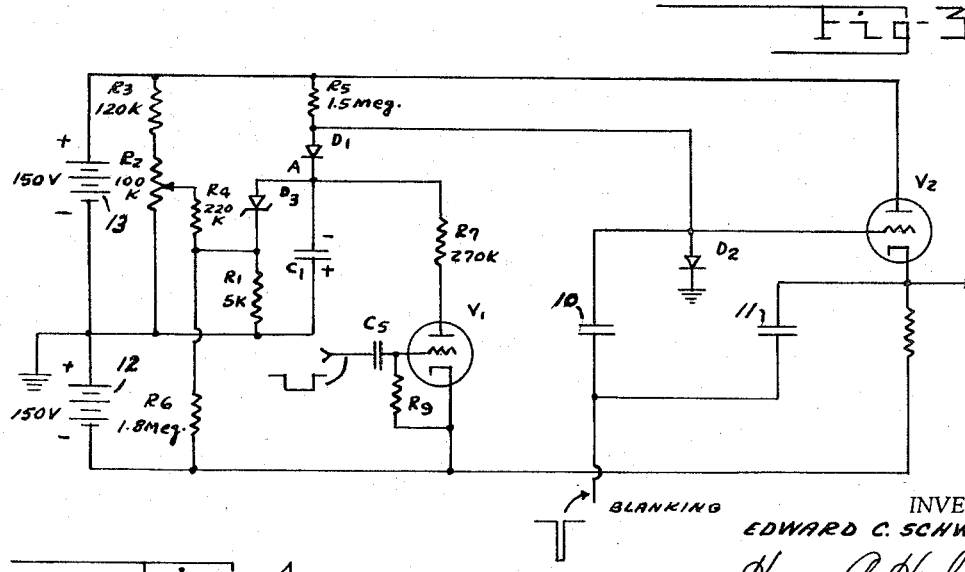
FIG. 4 is a schematic diagram of a function generator having the characteristic of FIG. 3.

FIG. 4 shows a schematic diagram of the function generator 8. The gain control voltage is initially developed across $C_1$ and is applied to the control grid of cathode follower $V_2$ through diode $D_1$. The blanking pulse is applied simultaneously to the control grid and cathode of $V_2$ through capacitors 10 and 11. The composite control voltage shown in FIG. 2(d) appears at the cathode of $V_2$.

Tube $V_1$ is in effect an electronic switch. The rectangular wave from MV 7 is applied to its control grid. During the intervals between the negative-going rectangular pulses this tube is fully conductive permitting $C_1$ to charge with the polarity shown from source 12 through $R_7$ and $V_1$ to a voltage determined by the desired initial value of the gain control voltage. The small current flow through $R_5$ and $D_1$ and thence through $R_7$ and $V_1$ exerts a slight influence on the $C_1$ voltage as does also the voltage derived from $R_2$ with which the initial $C_1$ voltage may be adjusted over a small range. Prior to the time that $C_1$ has attained full charge the zener diode $D_3$ will have broken down so that reverse diode current flows through $R_1$. $D_3$ may have a breakdown voltage of, for example, 8 volts. The voltage at the grid of $V_2$ is slightly less negative than at point A due to the small forward drop across $D_1$ the purpose of which is to isolate $C_1$ from the blanking pulse.

When the negative-going pulse from MV 7 is applied to the control grid of $V_1$, anode current in this tube is cut off for the duration of the pulse. During this interval $C_1$ discharges. Initially the discharge is through a pair of discharge circuits connected in parallel across the capacitor, one comprising $R_1$ and $D_3$ and the other comprising source 13, $R_5$ and $D_1$. As the capacitor voltage decreases the back voltage across zener diode $D_3$ decreases eventually falling below the breakdown value, at which time the back impedance of this diode changes to a very high value and, as a result, the discharge of the capacitor through the $R_1$–$D_3$ path is effectively terminated. However, $C_1$ continues to discharge through the other of the two paths.

Figure 3:
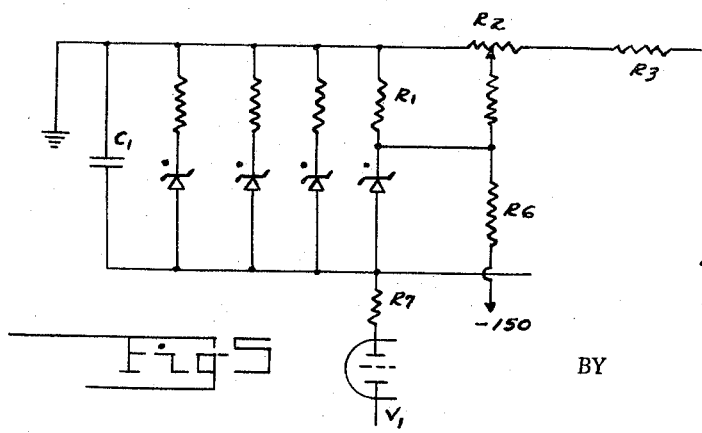
FIG. 3 is a graph of the gain control voltage versus time characteristic of the function generator on an enlarged scale.
Figure 3:
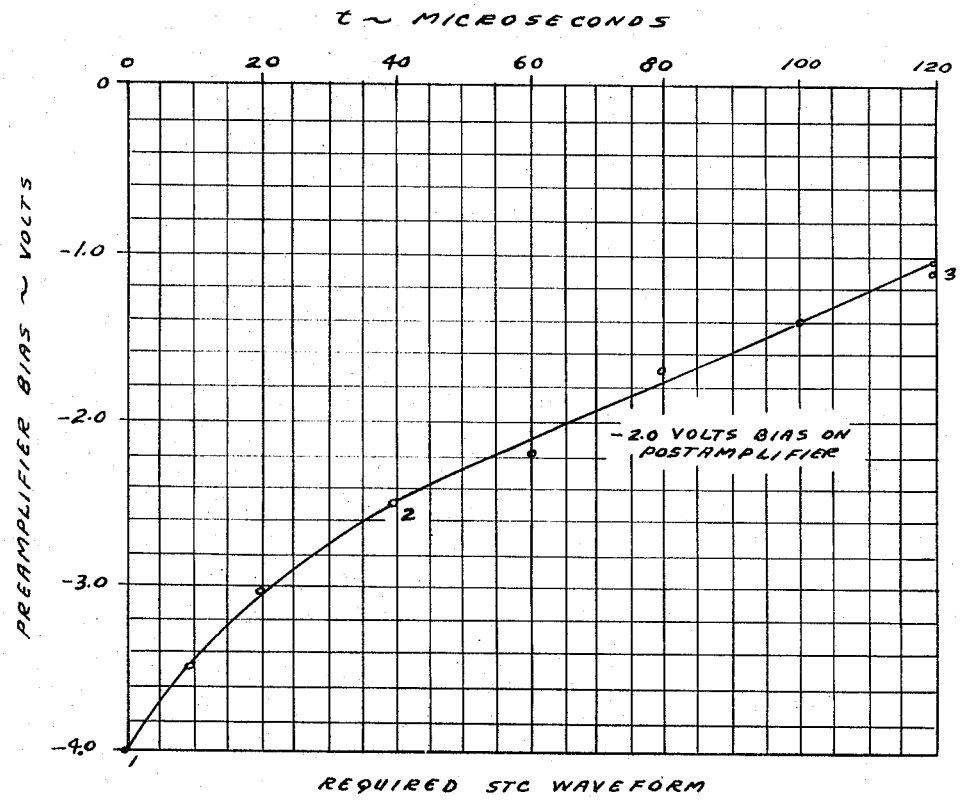

Because of the very low back impedance of zener diode $D_3$ in breakdown and the relatively low resistance of $R_1$, the discharge time constant through this path is less than the time constant through the path including source 13, $R_5$ and $D_1$. Consequently, when $D_3$ is in breakdown and $C_1$ is discharging through both paths the effective time constant is considerably shorter than the time constant after $D_3$ has passed out of breakdown and $C_1$ is discharging principally through the path including source 13, $R_5$ and $D_1$. Therefore, the rate at which the potential of point A rises during discharge of $C_1$ decreases after $D_3$ passes out of breakdown. In the example shown, the parameters are so selected that this changeover occurs after about 30 microseconds (FIG. 3).

When the negative-going rectangular pulse at the grid of $V_1$ ends, this tube becomes fully conductive permitting $C_1$ to recharge its initial state, thus concluding a cycle of operation. Throughout the discharge period the grid of $V_2$ accurately changes voltage at the same rate as point A because the current flow through $D_1$ is nearly constant due to the high value of $R_1$. $D_2$ is normally ineffective, but serves as a protective device to prevent the output of $V_2$ from going too far positive in the event a component such as $D_1$ fails. The gain control voltage at the cathode of $V_2$ is applied to the receiver, for example, to the preamplifier stages of the I.F. amplifier.

FIG. 5 illustrates the manner in which additional zener diode controlled parallel discharge paths may be employed to more accurately match a desired function through proper selection of the resistance values and the diode breakdown voltages.

I claim:

1. A function generator for producing a voltage that varies with time in a prescribed manner during a predetermined interval, said generator comprising: a capacitor across which said voltage is produced; a source of direct voltage; a charging circuit connecting said source to said capacitor for charging said capacitor to a predetermined voltage; a pair of discharge circuits connected in parallel across said capacitor, said circuits providing different discharge time constants; means for opening said charging circuit for the duration of said interval; and a zener diode connected as a series element in one of said discharge circuits, the breakdown voltage of said zener diode lying between the capacitor voltages at the beginning and the end of said interval.

2. In a radar system in which short pulses of high frequency energy are periodically radiated and in which echoes of said pulses are received in a receiver the gain of which may be controlled by an applied gain control voltage, apparatus for controlling the gain of said receiver as a direct predetermined function of range, comprising: a capacitor; a source of direct voltage; a charging circuit connecting said source to said capacitor for charging said capacitor to a predetermined voltage; a pair of discharge circuits connected in parallel across said capacitor, said circuits providing different discharge time constants; means synchronized with said radiated pulses for opening said charging circuit following each radiated pulse for an interval less than the repetition period of said pulses; a zener diode connected as a series element in the discharge circuit having the shorter time constant, said zener diode having a breakdown voltage lying between the capacitor voltages at the beginning and the end of said interval; and means for applying the voltage across said capacitor to said receiver as a gain control voltage.

3. Apparatus as claimed in claim 2 in which the last mentioned means comprises a cathode follower stage having the voltage across said capacitor applied to its input and having its output applied to said receiver as a gain control voltage, and in which means are provided for applying blanking pulses that are coincident with said radiated pulses simultaneously to the control grid and cathode of said cathode follower stage.

No references cited.

RODNEY D. BENNETT, *Acting Primary Examiner.*

D. C. KAUFMAN, *Assistant Examiner.*